(12) United States Patent
Ellingson

(10) Patent No.: US 7,108,902 B2
(45) Date of Patent: Sep. 19, 2006

(54) ROLL-UP FLOOR MAT

(75) Inventor: Robert T. Ellingson, Social Circle, GA (US)

(73) Assignee: Reese Enterprises, Inc., Rosemount, MN (US)

( * ) Notice: Subject to any disclaimer, the term of this patent is extended or adjusted under 35 U.S.C. 154(b) by 0 days.

(21) Appl. No.: 10/770,809

(22) Filed: Feb. 3, 2004

(65) Prior Publication Data
US 2005/0170129 A1   Aug. 4, 2005

(51) Int. Cl.
B32B 3/10 (2006.01)
A47L 23/26 (2006.01)
(52) U.S. Cl. .......... 428/54; 428/61; 428/217; 52/177; 52/181; 15/215; 15/217
(58) Field of Classification Search .......... 428/54, 428/52, 53, 58, 61, 517; 52/177, 181; 15/215, 15/217
See application file for complete search history.

(56) References Cited

U.S. PATENT DOCUMENTS

| | | |
|---|---|---|
| 3,039,575 A | 6/1962 | Graham |
| 4,568,587 A | 2/1986 | Balzer |
| 4,590,110 A | 5/1986 | Arens |
| 4,654,245 A | 3/1987 | Balzer et al. |
| 4,877,672 A | 10/1989 | Shreiner |
| 5,157,804 A | 10/1992 | Williams |
| 5,190,799 A | 3/1993 | Ellingson, III |
| 5,215,802 A | 6/1993 | Kaars Sijpesteijn |
| 5,486,392 A | 1/1996 | Green |
| 6,434,779 B1 | 8/2002 | Bartlett et al. |
| 2002/0139070 A1 | 10/2002 | Berndt, Jr. |

FOREIGN PATENT DOCUMENTS

| | | |
|---|---|---|
| GB | 2241166 | 8/1991 |
| WO | WO 99/34971 | 7/1999 |

OTHER PUBLICATIONS

Reese, Floor Protection Systems Catalog, Dec. 2003.
C/Spedisystems Catalog, Dec. 2003, Pedimat * Treadline * DuroMat * PediTred * Pedigrid.

*Primary Examiner*—Alexander S. Thomas
(74) *Attorney, Agent, or Firm*—Womble Carlyle Sandridge & Rice

(57) ABSTRACT

A commercial floor mat has a plurality of aluminum rails arranged in closely spaced side-by-side relationship and connected together by hinged connectors beneath the rails. Each rail has a pair of downwardly facing grooves on its underside extending along respective edges of the rail. Each connector has a flexible central web and a pair of spaced upstanding tabs disposed in the downwardly facing grooves of adjacent rails. The tabs have flexible barb-shaped ribs extending along their opposed faces to anchor the tabs in the grooves with a friction fit. The flexible central webs of the connectors facilitate hinged movement of connected rails to permit the mat to be rolled onto itself into a compact configuration.

26 Claims, 2 Drawing Sheets

ROLL-UP FLOOR MAT

TECHNICAL FIELD

This invention relates generally to floor mats. More particularly, the invention relates to commercial, roll-up floor mats formed by a plurality of elongated parallel aluminum rails interconnected with flexible hinges.

BACKGROUND

Floor mats for use with entryways in commercial buildings must satisfy a variety of special needs not necessarily present in residential buildings. For instance, it is desirable that a commercial floor mat inside the entrance of a retail store or office building be capable of removing debris such as snow and mud from the shoes of patrons as they traverse the mat. It is also desirable that such commercial floor mats be capable of accommodating large amounts of rainwater from the shoes and cloths of patrons without becoming soaked or wet. Finally, a commercial floor mat must provide continuous friction in any weather condition and must be able to support the heavy weight of people and merchandise as they traverse the entrance.

To meet the above and other needs, a variety of commercial floor mats have been developed and are part of the prior art. Perhaps the most ubiquitous of these commercial floor mats is the so-called roll-up floor mat or roll-up floor grate. The term "roll-up floor mat" will be used in the present discussion. In general, roll-up floor mats are designed to fit within a shallow rectangular well formed in the floor of a commercial building just inside an entrance. While there are a number of variations, these mats typically are formed by a plurality of closely spaced parallel aluminum rails, each of which is connected to its neighbors by means of an articulating joint. The articulating joints hold the rails in place with respect to one another, allow the mat to conform to variations in the floor of the well, and, perhaps most importantly, permit the mat to be rolled up upon itself into a compact configuration when necessary for cleaning or replacement. The articulating hinges that connect adjacent rails together usually are provided with openings that allow water, melting snow, and other debris collected from the shoes of patrons to pass through the mat for collection in the shallow rectangular well in which it rests. It is at least partially for this reason that such floor mats sometimes are referred to as floor grates.

The patent literature is replete with examples of roll-up commercial floor mats of the type discussed above. U.S. Pat. No. 4,590,110 of Arens, for example, discloses a commercial door mat with a multiplicity of parallel profiled bars, each having a generally U-shape with upstanding flanges interconnected at their lower ends by a horizontal web. A tread assembly fits in every other channel formed by the upstanding flanges. U.S. Pat. No. 4,568,587 of Blazer discloses a roll-up floor mat with rigid rails interconnected with elongated H-shaped flexible hinges. U.S. Pat. No. 4,654,245 of Blazer et al. discloses a floor mat of similar construction wherein the flexible hinges are further formed with feet that underlie the edges of the aluminum rails to cushion impact. In U.S. Pat. No. 5,157,804 of Williams, the articulating hinges are formed by elongated rod and socket joints and in U.S. Pat. No. 5,486,392 of Green, the aluminum rails are connected together along the undersides of their edges by flexible U-shaped hinge members, which also form feet that support the rails.

Finally, U.S. Pat. No. 6,434,779 of Bartlett et al. discloses a roll-up commercial floor mat wherein adjacent aluminum rails are connected together with flexible connector members. Each rail has a pair of legs depending from its lower surface and each connector member has a pair of upwardly facing U-shaped sockets configured and positioned to receive the legs of adjacent rails for securing the rails flexibly together. The legs and sockets have interengaging shoulders that retain the legs in the sockets once they are inserted during fabrication. The shoulders are necessary in part because the connector members are made of plastic and the walls that form the sockets tend to spread out under stress. Without the shoulders, the connector members of Bartlet et al. would easily be dislodged from the rails. Even with the shoulders, the sockets can spread under stress and the connector members become dislodged.

Roll-up commercial floor mats, such as those disclosed in the above patents, have proven somewhat successful in the applications for which they are designed. Nevertheless, they are still plagued with various problems and shortcomings inherent in their respective designs. As mentioned above, for example, the floor mat of Bartlett et al. can suffer from dislodgement of the legs of the rails from the sockets of the connector members under certain circumstances. It is perhaps for this reason that Bartlett et al. teach a pair of bendable anchor tabs extruded along the bottom side of each rail that can be bent outwardly against the outer walls of the sockets to prevent such dislodgement. Other prior art mats are difficult to assemble for a variety of reasons, not least of which being that some require assembly of adjacent rails and interconnecting hinges by sliding these components longitudinally together. This requires large amounts of room, is labor intensive, and inefficient.

Accordingly, there is a persistent need for a roll-up commercial floor mat that is easy, quick, and efficient to assemble, that does not suffer from dislodgement of rails and connecting hinge members, does not require ancillary anchor mechanisms to maintain attachment of the components, and that is attractive and easily rollable into a compact configuration. It is to the provision of such a roll-up floor mat that the present invention is primarily directed.

SUMMARY OF THE INVENTION

Briefly described, the present invention, in a preferred embodiment thereof, comprises an improved roll-up floor mat for use in commercial buildings. As with prior art commercial mats, the floor mat of this invention is designed to be installed in a shallow rectangular well formed inside an entryway of a building. The mat includes a plurality of long closely spaced parallel rails, which preferably are fabricated of extruded aluminum. Each of the rails is formed with an upper deck that is configured to receive and hold an elongated tread insert. In one embodiment, an upstanding lipped wall extends along each edge of the rail deck and the tread insert is slid into the facing grooves formed by the lipped walls. In any event, the tread inserts may be of any conventional type, including carpet treads, abrasive treads, vinyl treads, or otherwise, as is known in the art.

Each rail is further formed with a first pair of spaced depending legs that extend along the bottom of the deck just inside one edge of the deck. A second pair of spaced depending legs extend along the bottom of the deck just inside the other edge of the deck. Accordingly, a first downward facing slot is defined between the first pair of depending legs and a second downwardly facing slot is defined between the second pair of depending legs, each slot extending along the length of the rail.

Each rail of the roll-up mat is attached to adjacent rails by an elongated connector. Each connector, in the preferred embodiment, has a relatively flexible central web, a pair of spaced apart legs extending downwardly from the edges of the central web, and a pair of feet extending laterally outwardly from the bottom edges of the legs. Thus, the central web, legs, and feet of the connector form a generally Omega shape when the connector is viewed in cross-section. An elongated tab extends upwardly from each of the feet of the connector and each tab is provided along its opposed side edges with a set of barb-shaped ribs that extend along the length of the tab. In a preferred embodiment, each of the connectors is fabricated as a co-extrusion of plastic material with the legs, feet, and tabs being made of a relatively rigid higher durometer plastic material. The web and barbed ribs, on the other hand, are made of a relatively flexible lower durometer plastic material. Thus, the connector can flex along its length by virtue of the flexible web. Further, pads preferably are co-extruded along the bottoms of the feet of the connectors and these pads also are formed of a more flexible lower durometer plastic material. The pads provide cushioning and sound damping.

The upstanding tabs of each connector are positioned to be received in the downward facing grooves on the bottoms of two spaced apart adjacent rails to connect the rails together. As the tabs move into the grooves, their flexible barb-shaped ribs slide along the walls of the grooves. However, when the tabs are fully inserted in the grooves, they are essentially impossible to remove because of the barbed shape of the ribs bearing against the walls of the grooves. Thus, two adjacent rails are connected together quickly and easily during assembly of a floor mat by turning the rails upside down so that their grooves face upwardly and pressing the tabs of a connector into the adjacent grooves of two rails.

With a plurality of rails connected together using a corresponding plurality of connectors, to form a mat, the resulting mat is capable of being rolled up on itself into a compact configuration. This is facilitated by the relatively flexible webs of the connectors, which span the spaces between adjacent rails of the mat. Preferably, the flexible webs are provided with openings located along their lengths to permit water, melted snow, and other debris to fall between the rails and into the shallow well below.

Accordingly, a roll-up floor mat is now provided that successfully addresses the problems and shortcomings of the prior art in a unique way. Mats are easily and efficiently assembled by inserting the tabs of connectors into the grooves of adjacent rails and, once inserted, the tabs are fixed and do not tend to dislodge. Thus, no ancillary anchor tabs or other mechanisms are required to insure the integrity of the attachment of the connectors to the rails. These and other features, objects and advantages of the roll-up floor mat of this invention will become more apparent upon review of the detailed description set forth below taken in conjunction with the accompanying drawing figures, which are briefly described as follows.

DETAILED DESCRIPTION OF THE PREFERRED EMBODIMENTS

Figure 1:
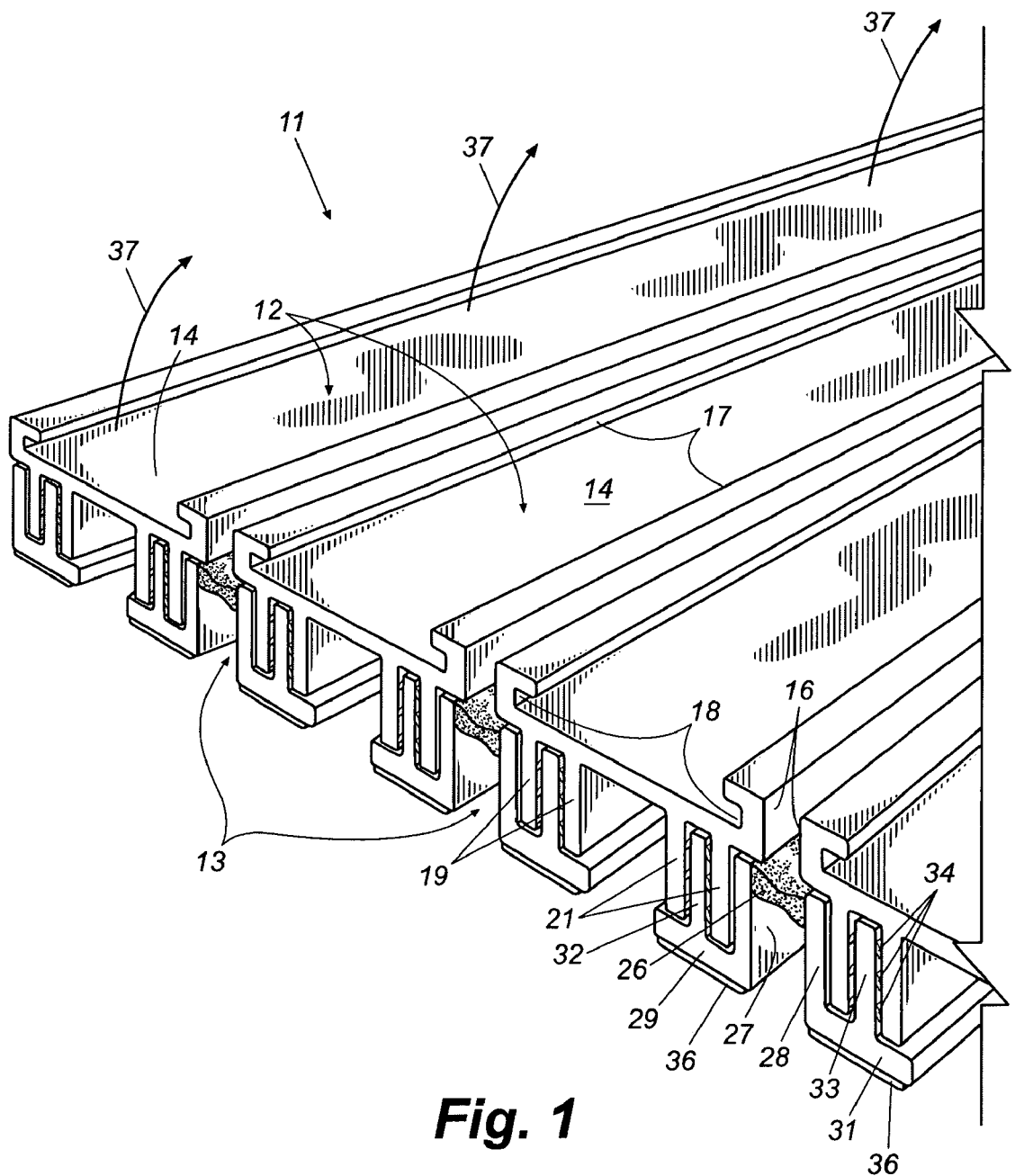
FIG. 1 is a perspective view of a relatively small section of a roll-up floor mat that embodies principles of the present invention in a preferred form.

Referring in more detail to the drawing figures, wherein like reference numerals refer to like parts throughout the several views, FIG. 1 illustrates a section of a roll-up floor mat configured according to the invention. The floor mat 11 comprises a plurality of extruded aluminum rails 12 arranged in spaced parallel relationship with respect to one another. Adjacent rails 12 are connected together by an extruded plastic connector 13, which is described in more detail below. The rails 12 are made, in the preferred embodiment, of extruded aluminum; although this is not a limitation of the invention and the rails might, in fact, be formed of any suitable material according to application specific requirements.

Figure 2:
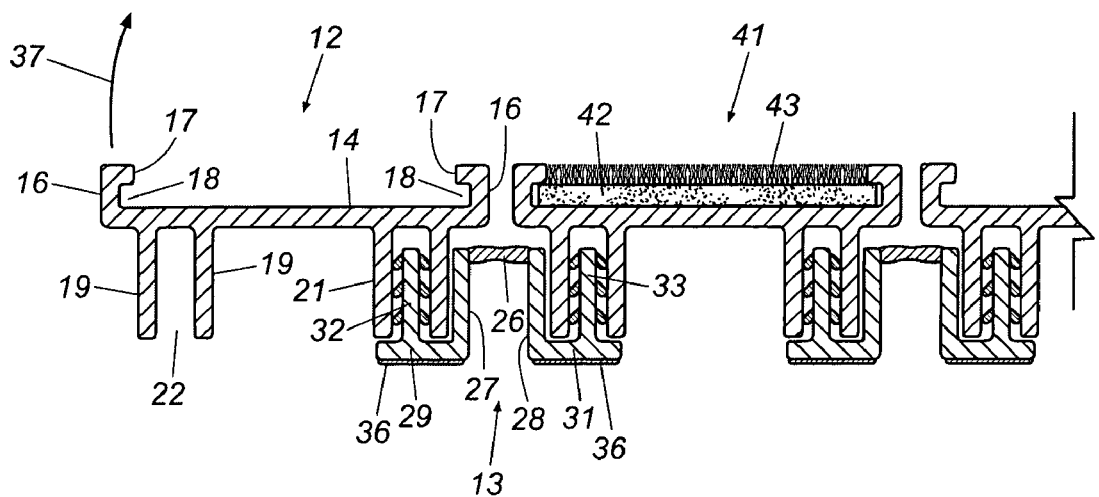
FIG. 2 is a cross-sectional view of a roll-up floor mat according to this invention illustrating the connection of adjacent rails with co-extruded connectors according to the invention.

Each rail 12 has an elongated rail deck 14 and a pair of short upstanding walls 16 that extend along the edges of the rail deck 14. Inwardly projecting lips 17 are formed along the tops of the upstanding walls 16 such that the lips and walls define inward facing opposed slots 18 extending along the edge portions of the sill deck. The slots 18 are sized and spaced to receive and hold tread strips 41, as best illustrated in FIG. 2. More specifically, tread strips 41, in the illustrated embodiment, are formed with a backing 42 and a tread surface 43, which may be carpet, abrasive material, vinyl, or otherwise. The edges of the backing 42 are captured in the opposed grooves 18 as shown in FIG. 2 to hold the tread strips in place on their respective rails. If the tread strips need to be removed for replacement, they may simply be slid out of their rails from the ends.

Figure 4:
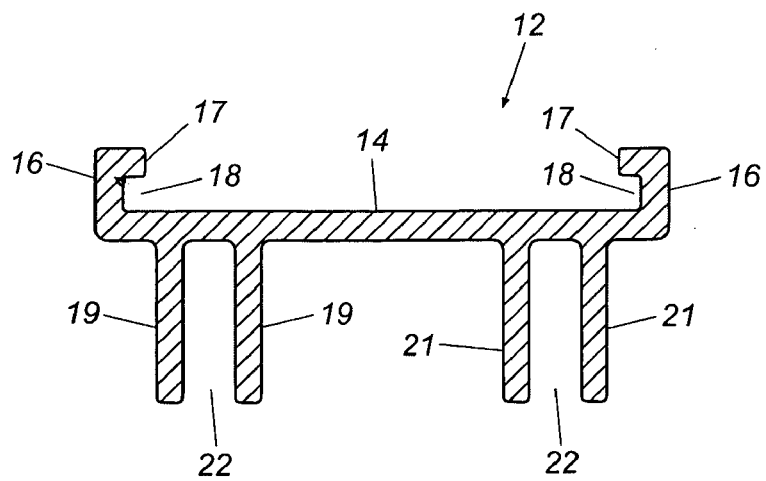
FIG. 4 is a cross sectional view of an aluminum rail configured according to the invention.

Referring primarily to FIG. 4, each rail is further formed with a spaced pair of depending legs 19 that project downwardly from the underside of the deck 14 just inside one edge portion thereof. Similarly, a spaced pair of depending legs 21 project downwardly from the underside of the deck 14 just inside the other edge portion thereof. Each pair of depending legs 19 and 21 defines a downwardly facing groove 22 between the legs of the pair. The grooves 22 preferably extend along the entire length of the rails 12 from one end thereof to the other.

As mentioned, adjacent rails 12 are connected together by connectors 13, as best illustrated in FIGS. 1 and 2. The connectors 13 preferably are formed of a unitary piece of plastics material by means of a plastics co-extrusion process. Each elongated connector has a central web 26 that is formed of a relatively flexible lower durometer plastic material. A first leg 27 projects downwardly along one edge of the central web 26 and a second leg 28 projects downwardly from the opposite edge of the central web 26. A first foot 29 projects laterally out from the bottom edge of the first leg 27 and a second foot 31 projects laterally out from the second leg 28. Thus, the central web 26, legs 27 and 28, and feet 29 and 31 form a generally Omega shape when the connector is viewed in cross-section as in FIG. 3.

Figure 3:
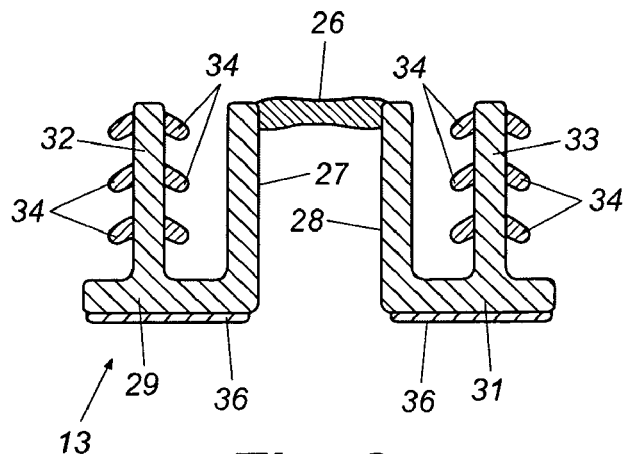
FIG. 3 is an enlarged cross-sectional view of a connector configured according to the invention.

Referring in particular to FIG. 3, a first tab 32 projects upwardly from the first foot 29 of the connector and, similarly, a second tab 33 projects upwardly from the second foot 31 of the connector as shown. The legs 27 and 28, feet 29 and 31, and tabs 32 and 33 preferably are formed in the co-extrusion process from a substantially rigid higher durometer plastic material so that they are not flexible like the central web 26. Each of the tabs 32 and 33 is provided along its opposite side surfaces with a set of spaced ribs 34. The ribs 34 are configured so that they angle downwardly as best illustrated in FIG. 3 rather like the barbs of an arrow. Accordingly, it may be said that each tab 33 is provided on its opposite sides with a set of barbed ribs 33. Finally, relatively thin pads 36 are formed on the bottoms of the feet 29 and 31. Both the barbed ribs 34 and the pads 36 are formed of a relatively flexible lower durometer plastic material, which may be the same material from which the central web 26 is formed if desired. As mentioned, the connector profile can conveniently be formed in a single efficient plastics co-extrusion process wherein the rigid and flexible components of the connector are simultaneously formed in a cross-head extrusion die. Plastics co-extrusion techniques per se are well known and need not be discussed in detail here.

As perhaps best illustrated in FIGS. 1 and 2, and as mentioned previously, adjacent rails 12 of the floor mat are connected together by corresponding connectors 13. More specifically, the upstanding tabs 32 and 33 of the connectors 13 are positioned and sized to be received in the downwardly facing grooves 22 along the edge portions of the adjacent rails to connect the rails together. As the tabs 32 and 33 move into the grooves 22 during assembly of the floor mat, the flexible barbed ribs 34 along the faces of the tabs bend or flex downwardly to allow the tabs to slip easily into the grooves. Once the tabs 32 and 33 are fully inserted in the grooves, however, removing them becomes exceedingly difficult because of the substantial friction created between the walls of the grooves 22 and the barbed ribs when the ribs are moved against their natural bending direction. As a result, once installed by simply being pushed into the rail grooves, the connectors become securely and permanently attached to the rails. There is no tendency for the tabs of the connectors to pull out of the rail slots because the slots do not tend to spread under stress or over time. Accordingly, unlike some prior art mats, there is no need for additional securing mechanisms such as interengaging shoulders or bendable anchors sometimes employed in the art.

The just described rails and connector configurations make assembly of a commercial floor mat of this invention exceedingly efficient. For example, a jig may be used that accepts and aligns a plurality of rails upside down with their grooves facing upwardly. Connectors may then be inverted and simply pressed into place with their tabs extending into the grooves of adjacent rails. Securing the connectors to the rails may be accomplished quickly with a simply roller tool, which is fast and efficient. Alternatively, a plurality of connectors might be aligned in a jig and the rails pressed onto the connectors from the top. In either case, assembly is simple, requires a minimum workspace, and does not entail additional steps to fix or anchor the connectors to the rails.

With a plurality of rails thus connected together with connectors as described, a commercial floor mat is formed. As is traditional, special peripheral rails and edges may be attached as desired or required. The floor mat, once assembled, can be rolled up on itself in the direction of arrows 37 (FIGS. 1 and 2) into a compact rolled configuration for transportation. The location of the flexible central webs of the connectors just below the rail decks facilitates the minimum radius roll and thus the most compact package. For installation, the floor mat is simply unrolled into the shallow rectangular well in which it is to reside. The flexible pads 36 co-extruded on the bottoms of the connector feet 29 and 31 rest on the floor of the well and provide both cushioning and sound damping, which are beneficial and desirable.

The invention has been described herein in terms of preferred embodiments and methodologies that are considered by the inventors to be the best mode of carrying out the invention disclosed herein. It will be understood, however, that many variations may be made to the illustrated embodiments all within the spirit of the invention exemplified in these illustrated embodiments. For example, there are many configurations and techniques for attaching tread strips to the tops of rails of commercial mats, many of which are disclosed in the patent documents listed above. All these and other techniques for attaching tread strips are contemplated by this invention. Further, the rails themselves, although preferably made of aluminum, also may be made of another material, such as another metal or a plastic material, and this too is contemplated by the invention. Finally, although it is preferred that the connectors be made of a unitary piece of co-extruded plastic material, they may be made of several pieces of different materials assembled together. For instance, the legs, feet, and tabs of the connectors might be made of aluminum with the flexible central web being made of, say, rubber that is attached along its edges to the aluminum legs. Thus, plastic co-extrusion of the connectors, while considered the best mode, is not a limitation. These and many other additions, deletions, and modifications might well be made to the preferred embodiments presented herein without departing from the spirit and scope of the invention as set forth in the claims.

What is claimed is:

1. A floor mat comprising:
   a plurality of elongated rails each having a rail deck configured to receive a tread strip, each said rail deck having edge portions;
   a first downwardly facing groove having spaced substantially parallel walls, said first groove depending from said rail deck and extending therealong adjacent one of said edge portions of said rail deck;
   a second downwardly facing groove having spaced substantially parallel walls, said second groove depending from said rail deck and extending therealong adjacent the other one of said edge portions of said rail deck;
   said plurality of elongated rails being arranged in side-by-side parallel relationship;
   a plurality of connectors connecting said plurality of rails together;
   each said connector having a first upwardly projecting tab received in a downwardly facing groove of one of said rails and a second upwardly projecting tab received in a downwardly facing groove of an adjacent one of said rails to connect said rails together, each of said tabs formed of a substantially rigid first material;
   each of said upwardly projecting tabs carrying flexible friction ribs in sliding frictional engagement with said walls of said grooves to resist lateral removal of said tabs from said grooves, said friction ribs being formed of a resilient second material having a lower durometer than the substantially rigid first material of the tabs and being compressed between said tabs and said walls of said grooves.

2. A floor mat as claimed in claim 1 and wherein each said downwardly facing groove is defined between spaced depending legs of said rail.

3. A floor mat as claimed in claim 1 and further comprising a lipped wall extending along and projecting upwardly from said edge portions of each said rail deck, said lipped walls defining inwardly facing opposed slots for receiving and holding tread strips.

4. A floor mat as claimed in claim 1 and wherein connectors are formed of extruded plastic material.

5. A floor mat as claimed in claim 1 and wherein said rails are formed of extruded aluminum.

6. A floor mat as claimed in claim 5 and wherein said connectors are formed of extruded plastic material.

7. A floor mat as claimed in claim 1 and wherein each said connector has a relatively flexible central web facilitating hinged movement of adjacent rails to permit said floor mat to be rolled on itself into a compact configuration.

8. A floor mat as claimed in claim 7 and wherein said relatively flexible central web is located adjacent said rail decks of connected rails and further comprising:
a first leg depending from and extending along one edge portion of said relatively flexible web to a bottom edge;
a second leg depending from and extending along another edge portion of said relatively flexible web to a bottom edge;
a first foot projecting laterally from said bottom edge of said first leg; and
a second foot projecting laterally from said bottom edge of said second leg;
said first tab projecting upwardly from said first foot and said second tab projecting upwardly from said second foot, said tabs received in said downwardly facing grooves.

9. A floor mat as claimed in claim 1 and wherein said friction ribs are formed of a relatively flexible plastic material.

10. A floor mat as claimed in claim 1 and wherein said first and second tabs have opposed faces and wherein said friction ribs are formed along said opposed faces and compressed between said opposed faces and the walls of said downwardly facing grooves.

11. A floor mat as claimed in claim 10 and wherein said friction ribs are generally barb-shaped.

12. The floor mat of claim 1 wherein said substantially rigid first material comprises a plastic material.

13. The floor mat of claim 12 wherein said resilient second material comprises a plastic material.

14. The floor mat of claim 13 wherein said plastic material comprises a polymer.

15. The floor mat of claim 13 wherein said plastic material comprises rubber.

16. The floor mat of claim 1 wherein said substantially rigid first material comprises aluminum.

17. The floor mat of claim 1 wherein said spaced substantially parallel walls of the first groove have spaced apart planar surfaces forming said first downwardly facing groove and said spaced substantially parallel walls of the second groove have spaced apart planar surfaces forming said second downwardly facing groove.

18. The floor mat of claim 17 wherein said friction ribs are in contact with said planar surfaces of said grooves.

19. A floor mat comprising:
a plurality of elongated rails aligned in side-by-side relationship, each rail having a rail deck with an upper surface and a lower surface and edge portions;
a plurality of connectors connecting adjacent ones of said rails together;
said rails having a downwardly facing groove formed along said lower surface of said rail deck adjacent to and extending along each said edge portion thereof each downwardly facing groove being defined between spaced substantially parallel walls;
each said connector having a central web and a pair of upstanding tabs located in said downwardly facing grooves of two adjacent rails to connect said rails together, each of said tabs formed of a substantially rigid first material; and
a pair of friction ribs on said upstanding tabs, said friction ribs being frictionally wedged within said grooves to lock said tabs securely within said grooves, said friction ribs being formed of a resilient second material having a lower durometer than the substantially rigid first material of the tabs and being compressed between said tabs and said walls of said grooves.

20. A floor mat as claimed in claim 19 and wherein said central webs of said connectors are formed of a relatively flexible material to facilitate hinged movement of adjacent rails to permit said floor mat to be rolled onto itself.

21. A floor mat as claimed in claim 19 and wherein said upstanding tabs of said connectors are formed of a relatively rigid material.

22. A floor mat as claimed in claim 19 and wherein said tabs have opposed faces and said ribs are formed on and extend along said opposed faces, said ribs being generally barb-shaped to allow insertion of said tabs laterally into said grooves but to resist extraction of said tabs laterally from said grooves.

23. A floor mat as claimed in claim 22 and wherein said connectors are unitarily formed of co-extruded plastic material.

24. A floor mat as claimed in claim 22 and wherein said rails are formed of aluminum.

25. A commercial floor mat comprising a plurality of extruded aluminum rails arranged in closely spaced side-by-side relationship, each rail having an upper surface and a lower surface, and a hinged connector connecting adjacent ones of said rails together, said rails having a pair of downwardly facing grooves extending along their lower surfaces adjacent edges of said rails, each groove being defined between spaced substantially parallel walls, and said hinged connectors having a relatively flexible central web and a pair of spaced upwardly projecting tabs straddling said central web, said tabs being disposed and secured in said downwardly facing grooves and carrying barbed-shaped friction ribs frictionally wedged within said downwardly facing grooves to lock said tabs securely in said grooves, each of said tabs being formed of a substantially rigid first material and each of said friction ribs being formed of a resilient second material having a lower durometer than the substantially rigid first material of the tabs, the friction ribs being compressed between said tabs and said walls of said grooves.

26. A commercial floor mat as claimed in claim 25 and wherein said tabs have opposed faces and said barbed-shaped friction ribs are made of relatively flexible material formed on and extending along said opposed faces.

* * * * *